(12) United States Patent
Priem et al.

(10) Patent No.: US 7,038,692 B1
(45) Date of Patent: May 2, 2006

(54) METHOD AND APPARATUS FOR PROVIDING A VERTEX CACHE

(75) Inventors: Curtis Priem, Fremont, CA (US); David Kirk, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 351 days.

(21) Appl. No.: 10/042,733

(22) Filed: Oct. 25, 2000

Related U.S. Application Data

(63) Continuation of application No. 09/056,386, filed on Apr. 7, 1998, now abandoned.

(51) Int. Cl.
 *G09G 5/36* (2006.01)
 *G09G 5/39* (2006.01)

(52) U.S. Cl. .................. 345/557; 345/531; 345/520; 345/503

(58) Field of Classification Search ............. 345/552, 345/557, 522, 582, 506, 426, 419, 420, 427, 345/581, 541–542, 519, 501–503, 520
See application file for complete search history.

(56) References Cited

U.S. PATENT DOCUMENTS

| | | | | |
|---|---|---|---|---|
| 5,392,393 A | * | 2/1995 | Deering | 345/505 |
| 5,421,028 A | * | 5/1995 | Swanson | 345/506 |
| 5,559,952 A | * | 9/1996 | Fujimoto | 345/557 |
| 5,687,357 A | * | 11/1997 | Priem | 345/570 |
| 5,760,792 A | * | 6/1998 | Holt et al. | 345/558 |
| 5,812,136 A | * | 9/1998 | Keondjian | 345/419 |
| 5,821,940 A | * | 10/1998 | Morgan et al. | 345/420 |
| 5,821,950 A | * | 10/1998 | Rentschler et al. | 345/522 |
| 5,828,382 A | * | 10/1998 | Wilde | 345/552 |
| 5,831,640 A | * | 11/1998 | Wang et al. | 345/552 |
| 5,880,737 A | * | 3/1999 | Griffin et al. | 345/582 |
| 5,898,437 A | * | 4/1999 | Deolaliker | 345/421 |
| 5,959,639 A | * | 9/1999 | Wada | 345/542 |
| 6,069,638 A | * | 5/2000 | Porterfield | 345/541 |
| 6,172,680 B1 | * | 1/2001 | Wong et al. | 345/581 |
| 6,175,368 B1 | * | 1/2001 | Aleksic et al. | 345/582 |
| 6,226,012 B1 | * | 5/2001 | Priem et al. | 345/582 |
| 6,232,981 B1 | * | 5/2001 | Gossett | 345/582 |

* cited by examiner

*Primary Examiner*—Kee M. Tung
(74) *Attorney, Agent, or Firm*—Cooley Goodward LLP

(57) ABSTRACT

A method for caching data defining vertices of a polygon to be displayed by an input/output display device including the steps of providing an index by a vertex for which data is to be cached, storing data defining attributes of a polygon at a vertex in a cache under the index provided, issuing a command signifying a polygon to be manipulated by indicating indices of the vertices of the polygon for which data is cached.

20 Claims, 4 Drawing Sheets

FIG. 3

Vertex A: x y z rgb u v f
Vertex B: x y z rgb u v f
Vertex J: x y z rgb u v f
Command: ABJ

FIG. 2B

| | |
|---|---|
| A | x, y, z, r, g, b, u, v, f, .... |
| B | x, y, z, r, g, b, u, v, f, .... |
| C | x, y, z, r, g, b, u, v, f, .... |
| D | x, y, z, r, g, b, u, v, f, .... |
| E | x, y, z, r, g, b, u, v, f, .... |
| F | x, y, z, r, g, b, u, v, f, .... |
| G | x, y, z, r, g, b, u, v, f, .... |
| H | x, y, z, r, g, b, u, v, f, .... |
| p | x, y, z, r, g, b, u, v, f, .... |

20

FIG. 4 f/com | X | Y | Z | rgb | U | V

FIG. 5 com | X | Y | Z | rgb | U | V | f

METHOD AND APPARATUS FOR PROVIDING A VERTEX CACHE

REFERENCE TO RELATED APPLICATION

This application is a continuing application, and claims the benefit of U.S. application Ser. No. 09/056,386, filed on Apr. 7, 1998 Now ABN, and further claims the benefit of U.S. application Ser. No. 09/053, 998, filed on Apr. 2, 1998.

BACKGROUND OF THE INVENTION

1. Field of the Invention

This invention relates to computer systems, and more particularly, to methods and apparatus for providing a cache to hold data representing vertices of polygons being displayed by a computer graphics output device.

2. History of the Prior Art

In three dimensional graphics, surfaces are typically rendered by assembling a plurality of polygons in a desired shape. The polygons are conventionally triangles having vertices which are defined in world space by three dimensional coordinates, color values, texture coordinates, fog values, and other values. The three dimensional world space coordinates are translated into screen coordinates in which horizontal and vertical values define screen position and a depth value determines how near a vertex is to the screen and thus whether that vertex is viewed with respect to other points at the same screen coordinates. The color values define the brightness of each of red/green/blue colors at each vertex and thus the color at each vertex. The texture coordinates fix each vertex on a texture map, a matrix of values stored in memory which together describe a pattern to be applied to the surface of the triangle to vary the color values in accordance with the pattern.

The graphics accelerator utilizes the three dimensional coordinates received from the central processing unit to define the vertices of a triangle in screen space and from those to determine the individual pixels describing each triangle. For each pixel of the triangle, the graphics accelerator carries out a series of complex manipulations to determine the color values, depth values, texture coordinates, and other attributes in two dimensional screen space. Once these attributes are determined for a pixel, the accelerator uses the texture coordinates to generate a texture value for each pixel in another complex manipulation. Finally, all of the screen attributes of a pixel which affect the color of that pixel are combined to provide final color values for the pixel; and these pixel data are placed with the pixel address and depth in a rendering pipeline.

As may be appreciated, the amount of data required to define each vertex in an advanced three dimensional system is substantial. In one particular arrangement, thirty-two bytes of data are required to describe a single vertex. To accomplish the operations by which the individual pixels which describe the triangle are defined for use by some graphics output device, it is first necessary to transfer the data defining each vertex of each triangle from system memory to the graphics accelerator circuitry. Conventionally, data defining each individual vertex of a triangle is individually transferred by the central processing unit to the graphics accelerator over the system input/output (I/O) bus. This requires that the central processing unit use the bus control circuitry to gain access to the system (I/O) bus in order to transfer the data defining each of the vertices.

Twenty to forty bytes of data are typically required to define all of the attributes at each of the vertices in world space. In a computer with a thirty-two bit bus I/O bus, five to ten writes by the central processing unit are needed to transfer data describing a single vertex. On the other hand, a command may require less than a byte. Consequently, to transfer data defining three vertices and a command to render a triangle requires between sixteen and thirty-one bus transfers. If each transfer requires a bus acquisition, it may take from sixteen to thirty-one bus acquisitions to transfer the data describing a single triangle. Even when burst transfers are utilized, no more than a single vertex can be transferred in one burst so as many as four bus acquisitions are required to transfer the vertex data and a command to render a single triangle. Thus, both normal and burst transfers are relatively slow processes constrained by bus bandwidth and require a significant amount of central processor time.

It is desirable to transfer data for rendering polygons more rapidly between a source of graphics data and graphics accelerator circuitry in a manner which reduces the effect of bus bandwidth.

SUMMARY OF THE INVENTION

This and other desirable results of the present invention are realized by apparatus and a method which includes the steps of transferring data defining individual vertices of a polygon from a source of graphics data to a graphics accelerator, caching data defining each of the vertices in a cache until all vertices of a complete polygon are described, transferring a command to the graphics accelerator to render a polygon defined in terms of vertices in the cache, and rendering the polygon defined by the data for the vertices.

Once data defining all vertices of a complete polygon are in the cache, any polygon using those vertices may be rendered by simply transferring a command to render the polygon defined in terms of its vertices. Thus, if sufficient vertices are in the cache, a series of rendering commands may render a series of additional polygons without the need to transfer any additional vertices by simply reusing stored vertices to form different polygons.

In one embodiment, the graphics accelerator may be adapted to produce screen values for the respective attributes using a texture engine, a scaling circuit, a setup circuit, and a lighting pipeline.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2B is a diagram of a cache memory which may be used in accordance with the present invention with the computer of FIG. 1.

FIG. 3 is an illustration of data defining three vertices of a polygon to be rendered by a graphics accelerator and a command to render a polygon used in accordance with an embodiment of the invention.

FIG. 4 is an illustration of data defining a vertex of a polygon to be rendered by a graphics accelerator and a command to render a polygon used in accordance with another embodiment of the present invention.

FIG. 5 is yet another illustration of data defining a vertex of a polygon to be rendered by a graphics accelerator in accordance with the present invention.

DETAILED DESCRIPTION

Figure 1:
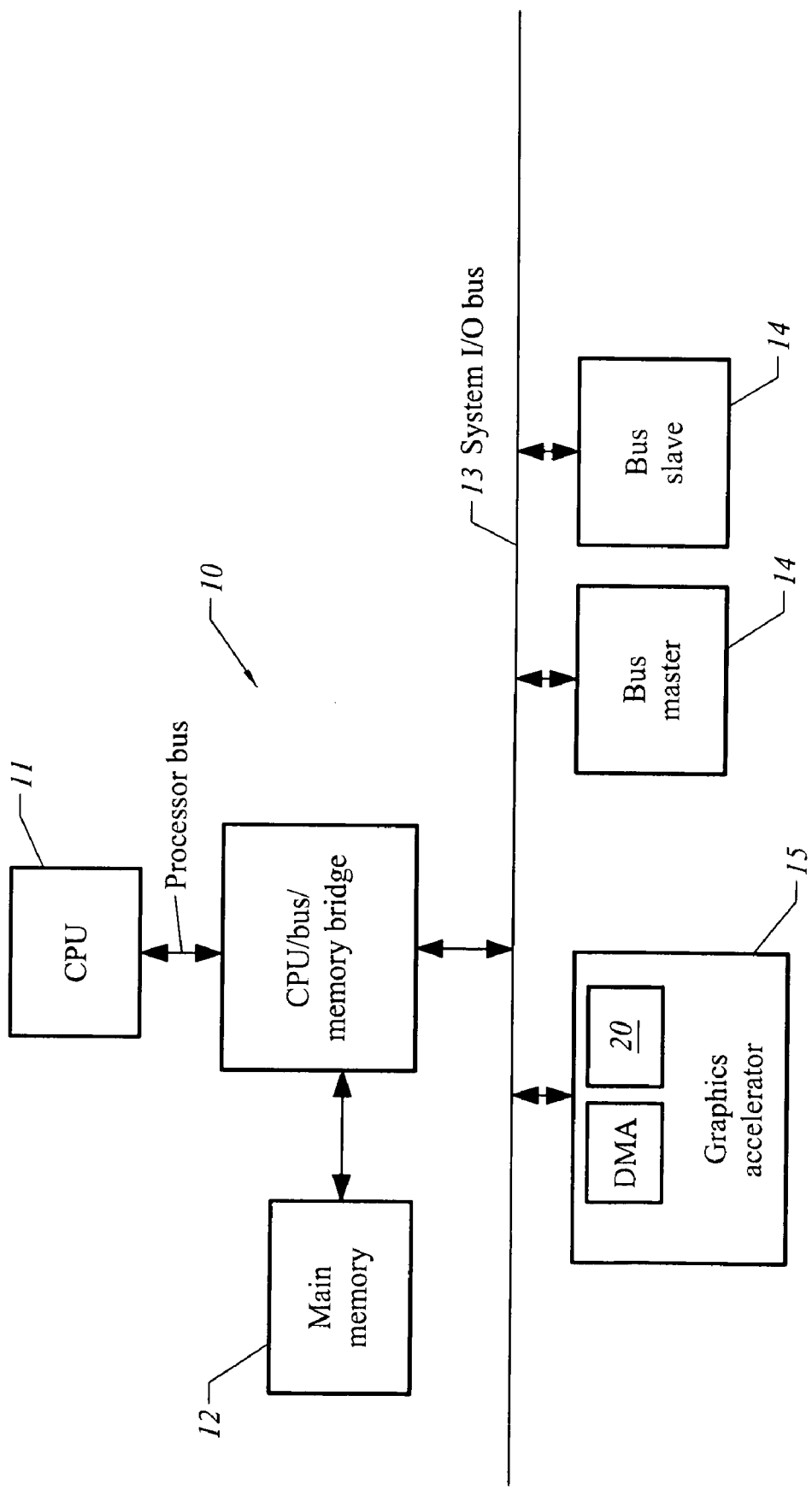
FIG. 1 is a block diagram describing a computer utilizing the present invention.

FIG. 1 is a block diagram illustrating a computer 10. The computer 10 includes a central processing unit 11, main memory 12, system input/output (I/O) bus 13, and various I/O devices 14 and 15. The I/O device 15 is a graphics accelerator designed in accordance with the present invention to speed the transfer of graphics data from the central processing unit 11 to the device 15. The graphics accelerator includes circuitry for rasterizing the data transferred, applying texture information, and rendering the pixel data defining the triangle to a frame buffer. In addition, the device 15 includes a DMA engine 17 and a cache 20 designed in accordance with the present invention.

Figure 6:
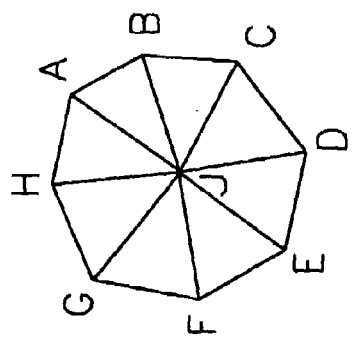
FIG. 6 is a diagram illustrating a first arrangement of polygons defining a shape which may be rendered by a graphics accelerator in accordance with the present invention.

An application program drawing three dimensional shapes typically renders surfaces by assembling a plurality of polygons in a desired shape. The polygons are conventionally triangles which are defined by three dimensional coordinates in world space, color values, and texture coordinates of their vertices. FIG. 6, for example, is a diagram illustrating the representation of a circle by a series of triangles having a number of vertices A–H and J. As may be seen, the triangles which represent the circle have a number of vertices which are identical from triangle to triangle. The vertex J, for instance, appears in each of the triangles defining the circle.

Figure 7:
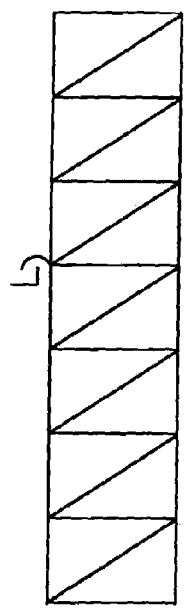
FIG. 7 is a diagram illustrating a second arrangement of polygons defining another shape which may be rendered by a graphics accelerator in accordance with the present invention.
Figure 8:
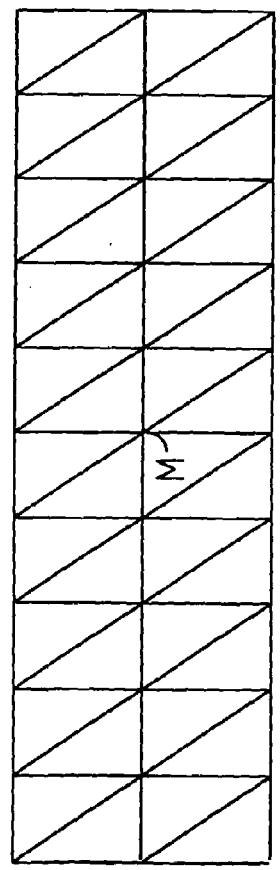
FIG. 8 is a diagram illustrating a third arrangement of polygons defining another shape which may be rendered by a graphics accelerator in accordance with the present invention.

FIG. 7 illustrates a rectangular shape defined by a series of triangles referred to as a "strip." In the strip of FIG. 7, each vertex (other than those at the corners of the rectangle) such as L is shared by three different triangles. FIG. 8 illustrates a larger rectangular shape defined by an arrangement of triangles referred to as a "mesh." As may be seen, internal vertices such as M in the mesh configuration are shared by six different triangles. In fact, in a large mesh, the average number of triangles which use each vertex is six.

Conventionally, an application program executing on the central processing unit 11 renders each triangle of a shape by transferring data defining the three vertices of the individual triangle followed by a rendering command for that triangle from system memory to the graphics accelerator 15. This requires that the central processing unit 11 gain access to the bus as described above in order to transfer the vertex data for each triangle in the shape.

FIG. 3 is an illustration of the data required to be transferred over the system bus to the graphics accelerator in order to define three exemplary vertices A, B, and J and a command to render a triangle ABJ in forming the circle of FIG. 6. In FIG. 3, each box represents four bytes of data. As may be seen, four bytes are required to represent each attribute x, y, z, u, and v while less than four bytes are required to represent each attribute r, g, and b. Similarly, representing the fog attribute (f) requires less than four bytes. In contrast to the amount of data required to represent a vertex, the command to render the triangle ABJ requires, in one embodiment, only four bits of data. Because of the amounts of data to be transferred, the transfer operation for pixel data defining one vertex of a triangle typically requires as many as ten bus accesses to accomplish.

It should be noted that the command format allows a "no-op" command to be implemented by naming all three vertices identically (e.g., JJJ); since such a command describes a point, no triangle is drawn, and the effect is a "no-op" command.

Thus, to render each triangle, the central processing unit 11 has to acquire access to the system I/O bus 13 as few as ten and as many as thirty-one times to transfer the vertex data and a rendering command to the graphics accelerator 15. Historically, this has not slowed operations appreciably since graphics accelerators have not functioned very rapidly. However, as graphics accelerators have become faster, central processing units have been unable because of the limited bus bandwidth to supply sufficient data to a graphics accelerator to keep the accelerator operating at full speed.

The operation of the computer may be accelerated by a new process by which an application program establishes a large transfer buffer in memory in which data describing a very large number of vertices may be stored. The application program commands a direct memory access (DMA) engine which may be positioned with the graphics accelerator 15 to transfer from the transfer buffer to the graphics accelerator the vertex data needed to render a polygon. The application program commands the graphics accelerator to render the triangle utilizing the vertex data transferred by the DMA engine. Even though the use of a DMA engine reduces the use of the central processing unit and thereby accelerates operations of the computer as a whole, the same bus bandwidth restrictions apply to transfers by the DMA engine so the transfer process itself is not faster.

Figure 2A:
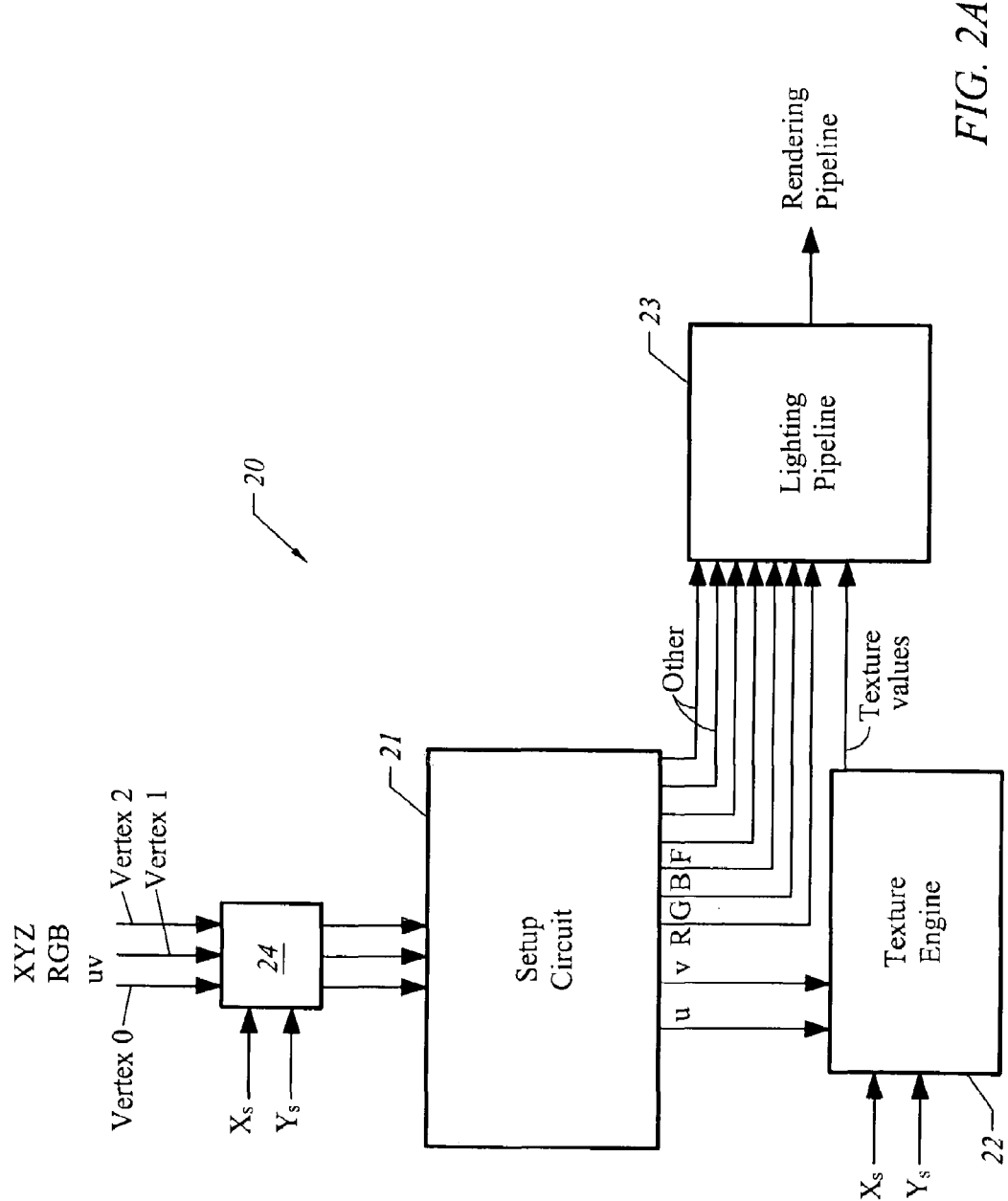
FIG. 2A illustrates an exemplary graphics accelerator circuit which may be used in accordance with the present invention with the computer of FIG. 1.

The present invention reduces the need for bus bandwidth and allows triangles to be rendered at a speed at which the graphics accelerator is designed to operate. In order to accomplish this, the present invention utilizes a cache 20, as shown in FIGS. 2A and 2B, which is a part of the graphics accelerating device 15 to store vertices. The cache 20 stores vertices of polygons as they are transferred to the device 15 either by a DMA engine or the central processing unit. The vertices are then held in the cache 20 until replaced. Once at least three vertices of a first triangle has been transferred to the graphics accelerating device 15 and stored in the cache 20, any vertex data in the cache may be used and reused to render any triangles defined by those vertices. Since a typical shape rendered on the output display (e.g., the shape illustrated in FIG. 6) is assembled from a plurality of triangles many of which have vertices which are vertices of other triangles, if vertices of one triangle are in the cache and a first triangle has been rendered using these vertices, it requires only the addition of data defining a single additional vertex to allow the rendering of a second triangle. Thus, a first triangle (for example, triangle ABJ in FIG. 6) may be rendered by the transfer of the three vertices A, B, and J and a rendering command. Then, a triangle adjoining the first triangle ABJ and having two of the vertices of the first triangle (such as the triangle BCJ) may be rendered by the transfer of a single additional vertex (C) to the cache 20 followed by a command to the graphics accelerator 15 to render the triangle BCJ. Thus, rather than requiring three vertices and a render command to render an additional triangle after the first triangle of an interrelated group of triangles has been rendered, only a single additional vertex and a single render command need be transferred over the system bus. Since the amount of data defining a vertex varies from twenty to forty bytes, this may reduce the amount of data to be transferred in order to generate a second triangle by up to eighty bytes. This is a significant reduction in the data which needs to be transferred in order to render any triangle which utilizes vertex data already in the cache 20. In this simple case, the process divides the time required to transfer data across the system bus almost in half.

FIG. 2A illustrates an exemplary graphics accelerator circuit which may be used in accordance with the present invention with the computer of FIG. 1. In general, the circuit 15 includes a setup engine 21 which receives input values for the various attributes defining the three vertices of any triangular surface being depicted. Before transfer to the setup engine 21, the x, y, u, and v values representing the vertices of the triangle are processed by a scaling circuit 24. The scaling circuit 24 receives the x, y, u, and v values representing the vertices of the triangle and utilizes the maximum and minimum values of each to determine a proper scale for a texture map. The x, y, and z coordinates may be provided by an application program as either screen space or world space values. The change from world space to screen space is based on a perspective transformation process. The scaling circuit 24 may also determine the pixels within a triangle from the x and y screen values of the vertices and generate specific screen x and y values for these pixels. The setup circuit 21 utilizes the x, y, and z screen values of the vertices to determine screen values for each of the attributes of each pixel in the triangle. The process of computing perspective-correct screen values for the attributes from world space vertex values can expressed by a geometric relationship. Gating circuitry which carries out addition, subtraction, multiplication, and division steps can be employed to produce perspective correct screen values for each of the attributes at each pixel position. The texture coordinates provided by the setup circuit 21 are transferred to a texture engine 22. The texture engine 22 utilizes those input values to determine texture coordinates at a plurality of positions within each pixel in accordance with the foregoing discussion of the invention. For example, the texture engine 22 may translate the texture coordinates at each of a plurality of positions within a pixel into texture values at those positions and blend the texture values to realize a final texture value for each pixel. This final texture value is transferred to a lighting pipeline 23 where the texture value and the other various attributes from the setup circuit 21 are utilized to modify the color value of the particular pixel in the sequence of pixels utilized to describe the triangle. From the lighting pipeline, the pixels are transferred to the rendering pipeline.

In FIG. 2B, an embodiment of the cache 20 is illustrated in which data defining each vertex may be stored by the application program executing on the central processing unit 11. A particular cache 20 includes positions for data defining sixteen individual vertices in one embodiment and may include space for a tag. A position in a cache storing sixteen vertices may be selected by the use of only four tag bits. By selecting the particular cache positions in which the vertices reside, the application may utilize vertex data already stored in the cache by simply transferring commands designating the vertices to be used in any triangle to be rendered.

The vertices may be stored in the cache 20 in a number of different ways. For example, the storage space in the cache may be memory mapped so that an application directs data describing a particular vertex to a particular memory address and recalls the data from that memory address when it is to be used in describing a triangle. The data describing a particular vertex may be placed in the cache 20 under software control. This allows a cache position to be designated by an index which requires significantly less data to describe than does an address. Thus, the application program may select cache positions for storage of vertex data which may be designated in the manner in which the vertices are numbered in FIG. 6, for example. A command to render a triangle may designate a triangle by these same indexed representations and thereby require the transfer of less command data over the bus.

Software control over the storage of the data in the cache 20 may be accomplished by an application program which provides the means to generate a list of indexed positions in the cache 20 and also provides a replacement policy for the data in the cache 20. This allows the application to designate the vertices making up a triangle to be rendered in commands in accordance with an indexing designation used for the storage space. In a typical case, such a designation requires four bits of data space to implement a sixteen entry cache. In such an embodiment of the invention, the central processing unit store vertices in the cache 20 in storage spaces which the application program designates. Then, the central processing unit designates a triangle to be rendered by simply designating the indices of three vertices already stored in the cache 20 using a single command to the graphics accelerator which directs that the rendering process commence.

Software control over the storage of the data in the cache 20 may also be accomplished in a similar manner by a software driver for the graphics accelerator which is equipped to generate a list of cache positions and to execute a replacement policy for data in the cache.

The command data itself may be transferred from an application program to the graphics accelerator in a number of ways. An application may cause the central processing unit to transfer a command via the system I/O bus to the graphics accelerator for execution after vertices have been placed in the cache. Such a command may be addressed to a particular register on the graphics accelerator so that the receipt of vertex identifications at the register indicates the command intended. In a system utilizing a DMA engine to transfer vertex data, a command may be included within the data defining a particular vertex. For example, the data needed to represent fog (f) and the data needed to represent r/g/b values each requires less than the four bytes allocated to it in the vertex data stream. The space not used by the fog attribute or the r/g/b attributes in data defining a vertex may be utilized to transfer a command to render a triangle for which all of the vertices are in the cache or are included in the particular transfer of vertex data which includes the command to render. Such an arrangement of data is illustrated in FIG. 4. This reduces the need to transfer commands separately and eliminates any bus access to assist the transfer of such a command. Once any two vertices of linking triangles have been transferred to the cache 20 using such a transfer method, it is only necessary to transfer data defining one additional vertex in order to commence the rendering of that triangle since the command for rendering may be included with the data defining the last vertex. In fact, it is possible to embed commands to render more than one triangle in the data defining a vertex and thereby lower the amount of data transferred even more.

Another manner of transferring commands to the graphics accelerator by a DMA engine is to add some data space to the format in which the data defining a vertex is transferred. For example, FIG. 5 illustrates a format in which an additional four bit space is added to the left of the vertex definition data. Similarly, command data might be added at the right or any other position in the format. Using such a format requires more data transfer time than does the last described embodiment but is quite simple and easy to implement.

Another modification of the invention allows a series of triangles to be generated once vertices have been transferred for those triangles to a cache 20 in the various manners described above. For example, when the shape to be described is a strip such as is shown in FIG. 7, all of the vertices except those at the corners of the rectangle are used and reused in three different triangles. If only sixteen vertices have been transferred to the cache 20, the entire shape shown in FIG. 7 may be described by sending a series of fourteen commands to render the fourteen triangles which may be defined by the sixteen vertices. A sequence of twelve bits of command data is sufficient to transfer a command to render any single one of the fourteen triangles since four bits will identify each vertex in the cache 20. Those skilled in the art will appreciate the reduction in data transfer for both vertices and commands which this allows. An even greater advantage is obtained in describing a shape such as the mesh of FIG. 8. If fifteen vertices are placed in the cache 20 and a total of sixteen rendering commands are transferred, sixteen triangles are described for an output device.

Similar techniques as those described above for transferring commands may also be utilized for transferring data indicating the particular vertex which is being designated by a sequence of data being transferred. That is, data transferred by an application to a particular register may designate data to be stored in a particular cache position. In a data transfer using a DMA engine, the particular vertex may be designated by data indicated by an index value added to the format or included within excess space provided for attributes which do not use the entire space allotted by the format.

One considerable advantage of the present invention is that the cache 20 may be utilized to draw other than the typical triangles used to describe shapes. By defining a number of vertices, the shape of any particular quadrilateral may be defined. Thus, polylines (lines with fill of various widths) may be drawn using the cache 20 and describing vertices which describe segments of the line.

Figure 9:
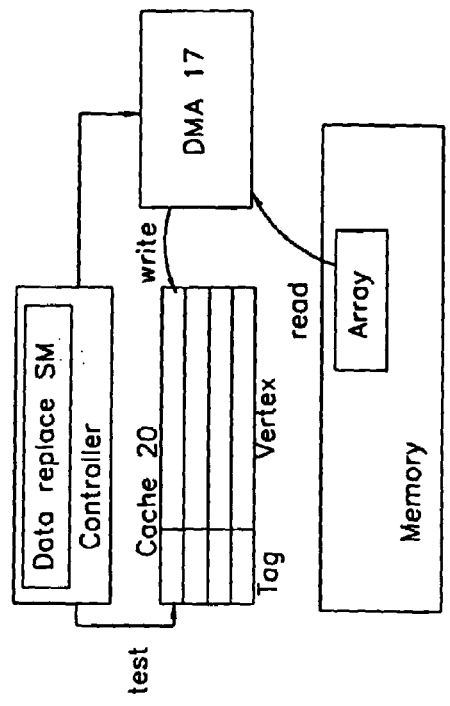
FIG. 9 is a diagram illustrating the use of a hardware controlled cache designed in accordance with the present invention.

An additional embodiment of the invention utilizes a hardware arrangement to manipulate the data stored in the cache 20, as shown in FIG. 9. In order to accomplish such an arrangement, vertex data defining a large plurality of vertices to be displayed in stored in a portion of memory by the application program. For example, an application might place vertex data at any of the memory mapped positions in a memory array of 64K vertices. Each entry in the cache 20 carries a sixteen bit tag. A command initiated by an application includes three vertices each described by sixteen bits which are sufficient to access any vertex stored in the 64K region of memory. The command may be transferred to the graphics accelerator either by the central processing unit or a DMA engine on the graphics accelerator in the manner explained above. When the command is received by the graphics accelerator, the hardware cache controller of the accelerator checks the cache 20 to determine whether all of the vertex data exists in the cache 20. If the vertex data exists in the cache, the triangle may be rendered immediately. If any of the vertex data is not in the cache 20, the accelerator causes the DMA engine to read the vertex data in the region maintained by the application in memory and write the data to the cache 20. With the vertex data in the cache, the triangle is rendered. It should be noted that in such an arrangement, vertex data is not written across the system bus by the central processing unit. The vertex data is always read from memory by the DMA engine on the graphics accelerator. In order to function with the cache 20, the hardware control for the cache 20 may utilize a state machine to implement an algorithm for replacing data in the cache where new data is required to draw triangles.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A graphics system, comprising:
   an input/output (I/O) bus;
   a central processing unit (CPU) having an associated system memory, said CPU and said associated system memory coupled to said I/O bus, said CPU adapted to issue commands for rendering polygons of a graphical image, said CPU having to acquire access to said I/O bus in order to transfer vertex data across said I/O bus;
   a graphics accelerator coupled to said I/O bus, said graphics accelerator comprising:
      a cache for storing vertex data;
      a cache controller configured to receive a command to render a polygon from said CPU, said cache controller checking said cache for previously cached vertex data for vertices of said polygon; and
      said graphics accelerator configured to utilize said vertex data to render pixel data for said polygon;
   wherein said graphics accelerator caches vertex data received from said I/O bus to reduce the number of data transfers of vertex data across said I/O bus required to render polygons in response to said commands issued from said CPU.

2. The graphics system of claim 1, further comprising: a state machine for directing said cache controller to update said cache.

3. The graphics system of claim 1, wherein said CPU provides an index value for each vertex of a polygon to be rendered and said cache controller checks said cache for entries having said index value.

4. The graphics system of claim 1, wherein said cache controller requests a transfer across said system bus from said system memory of any additional vertex data not present in said cache which is required to render said polygon.

5. The graphics system of claim 4, wherein vertex data transferred into said graphics module is written into said cache for use in rendering subsequent polygons.

6. A graphics system, comprising:
   an input/output (I/O) bus;
   a central processing unit (CPU) coupled to said I/O bus, said CPU adapted to issue requests to render polygons of a graphical image, said CPU having to acquire access to said I/O bus in order to transfer vertex data across said I/O bus;

a system memory coupled to said I/O bus, said system memory including a transfer buffer for storing vertex data associated with vertices of polygons to be rendered; and a graphics accelerator coupled to said I/O bus for rendering polygons, comprising:
  a cache for storing vertex data;
  a direct memory access engine for transferring vertex data from said transfer buffer to said cache;
  a cache controller configured to receive a request to render a polygon from said CPU which includes index values of vertices of said polygon, said cache controller checking said cache for entries having said index values and obtaining any additional required vertex data by directing said direct memory access engine to transfer required vertex data from said transfer memory; and
  said graphics accelerator configured to utilize said vertex data to render pixel data for said polygon;
  wherein said graphics accelerator caches vertex data received from said I/O bus to reduce the number of data transfers across said I/O bus required to render polygons in response to said requests issued from said CPU.

7. The graphics system of claim 6, further comprising: a state machine for directing said cache controller to update said cache.

8. The graphics system of claim 6, wherein said direct memory access engine writes transferred vertex data into said cache, whereby said cache is updated for use in rendering at least one subsequent polygon.

9. The graphics system of claim 6, wherein a transfer of vertex information for a polygon requires a plurality of data transfers across said I/O bus, whereby use of cached vertex data reduces the number of data accesses required for rendering a polygon.

10. The graphics system of claim 6, wherein said CPU is coupled to said I/O bus by a graphics bridge.

11. The graphics system of claim 10, wherein said system memory is connected to said graphics bridge.

12. A computer as in claim 6 in which said cache has a memory mapped storage space for the data associated with said vertices.

13. In a graphics system having a central processing unit (CPU) and associated system memory coupled to a graphics accelerator by an I/O bus, a method of reducing data transfers across said I/O bus to said graphics accelerator required to render polygons, comprising:
  at said graphics accelerator, receiving vertex data from said CPU, said CPU having to acquire access to said I/O bus in order to transfer vertex data across said I/O bus;
  storing vertex data in a cache that is local to said graphics accelerator;
  at said graphics accelerator, receiving a command from said CPU to render a polygon, said command identifying index values of vertices of said polygon;
  said graphics accelerator checking index values of said cache for vertex data of said vertices of said polygon; and
  said graphics accelerator reading said cache to obtain vertex data for each vertex of said polygon having cached vertex data;
  wherein said graphics accelerator caches vertex data received from said I/O bus to reduce the number of data transfers across said I/O bus required to render polygons in response to said command.

14. The method of claim 13, further comprising:
  for each vertex of said polygon not having cached vertex data, said graphics accelerator performing a memory transfer operation to transfer required vertex data from said system memory.

15. The method of claim 14 further comprising: rendering said polygon using vertex data for each of said vertices.

16. The method of claim 13 further comprising: updating said cache with vertex data for vertices not having vertex data stored in said cache, wherein said updating includes:
  creating an array of vertices in a memory,
  indexing data for each of said vertices which is stored in said array,
  selecting from said array vertices defining a polygon to be rendered, and
  transferring to said cache said data for each of said selected vertices.

17. In a graphics system having a central processing unit (CPU) and associated system memory coupled to a graphics accelerator by an I/O bus, a method of reducing data transfers across said I/O bus required to render polygons, comprising:
  at said graphics accelerator, receiving vertex data from said CPU, said CPU having to acquire access to said I/O bus in order to transfer vertex data across said I/O bus;
  at said graphics accelerator, receiving a command from said CPU to render a polygon, said command identifying index values of vertices of said polygon;
  said graphics accelerator checking a cache for vertex data for said vertices of said polygon, wherein said cache is local to said graphics accelerator;
  for each vertex of said polygon having cached vertex data, said graphics accelerator reading said cache to obtain vertex data; and
  for each vertex of said polygon not having cached vertex data, said graphics accelerator performing a memory transfer operation to transfer required vertex data from said system memory;
  wherein said graphics accelerator caches vertex data received from said I/O bus to reduce the number of data transfers across said I/O bus required to render polygons in response to commands from said CPU.

18. The method of claim 17 further comprising: rendering said polygon using vertex data for each of said vertices.

19. The method of claim 17 further comprising:
  said graphics accelerator updating said cache with transferred vertex data from said memory transfer operation.

20. The method of claim 19, further comprising:
  creating an array of vertices in a memory,
  indexing data for each of said vertices which is stored in said array,
  selecting from said array vertices defining a polygon to be rendered, and
  transferring to said cache said data for each of said selected vertices.

* * * * *